(12) United States Patent
Van Der Klooster et al.

(10) Patent No.: US 11,794,558 B2
(45) Date of Patent: Oct. 24, 2023

(54) MOBILE ACCOMMODATION AND BORDER DEVICE

(71) Applicant: Polyplastic Group B.V., En Rotterdam (NL)

(72) Inventors: Kenzie Van Der Klooster, En Rotterdam (NL); Pieter Sietze Krijgsman, En Rotterdam (NL); Bianca Catharina Van Bemmel-Welle, En Rotterdam (NL)

(73) Assignee: POLYPLASTIC GROUP B.V., Rotterdam (NL)

( * ) Notice: Subject to any disclaimer, the term of this patent is extended or adjusted under 35 U.S.C. 154(b) by 102 days.

(21) Appl. No.: 17/377,703

(22) Filed: Jul. 16, 2021

(65) Prior Publication Data

US 2022/0016959 A1    Jan. 20, 2022

(30) Foreign Application Priority Data

Jul. 20, 2020 (NL) ..................................... 2026096

(51) Int. Cl.
*B60J 1/00* (2006.01)
*B63B 19/00* (2006.01)
*B60J 10/70* (2016.01)

(52) U.S. Cl.
CPC ............... *B60J 1/007* (2013.01); *B60J 1/008* (2013.01); *B60J 10/70* (2016.02); *B63B 19/00* (2013.01); *B63B 2019/0046* (2013.01)

(58) Field of Classification Search
CPC .. B60J 1/007; B60J 10/70; B60J 1/008; B63B 19/00; B63B 2019/0046
See application file for complete search history.

(56) References Cited

U.S. PATENT DOCUMENTS

2020/0062088 A1*  2/2020  Veeneman ............. F16B 2/245

FOREIGN PATENT DOCUMENTS

| EP | 867590 A1 * | 9/1998 | .............. B60J 1/007 |
| GB | 2456181 A | 7/2009 | |
| WO | WO-2015166273 A1 | 11/2015 | |

* cited by examiner

*Primary Examiner* — Dennis H Pedder
*Assistant Examiner* — Melissa Ann Bonifazi
(74) *Attorney, Agent, or Firm* — PERRY + CURRIER INC.

(57) ABSTRACT

A mobile accommodation, particularly a recreational accommodation such as a boat, camper or caravan, comprises a room enclosed by walls (10), wherein at least one of the walls comprises an opening (15) in which an optionally transparent window is arranged. Arranged on a first side all around the opening (15) is a casing frame (30) in which the window is mounted. A border device (20) is provided all around the opening on an opposite side. The casing frame (30) and the border device (20) are connected to each other for axial adjustment transversely of the wall (10) while enclosing a wall part of the wall. The border device (20) comprises a relatively stiff frame body (21) which carries on a side facing toward the wall a flexible skirt (25) and lies sealingly against the wall therewith.

11 Claims, 2 Drawing Sheets

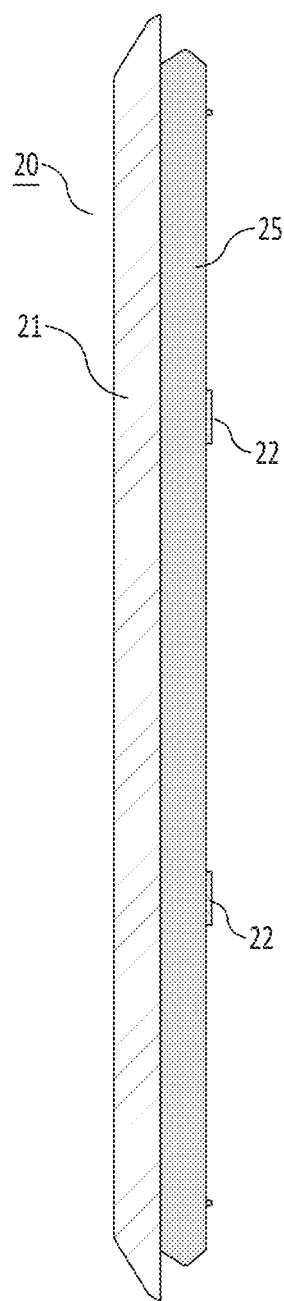
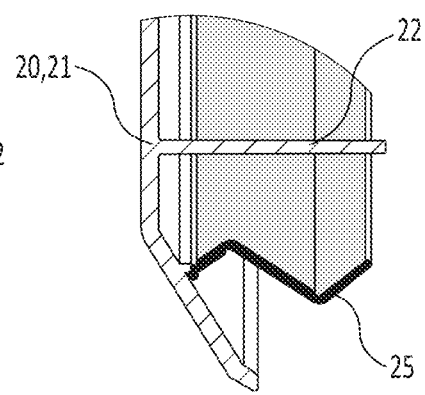
Fig.4A
Fig.3
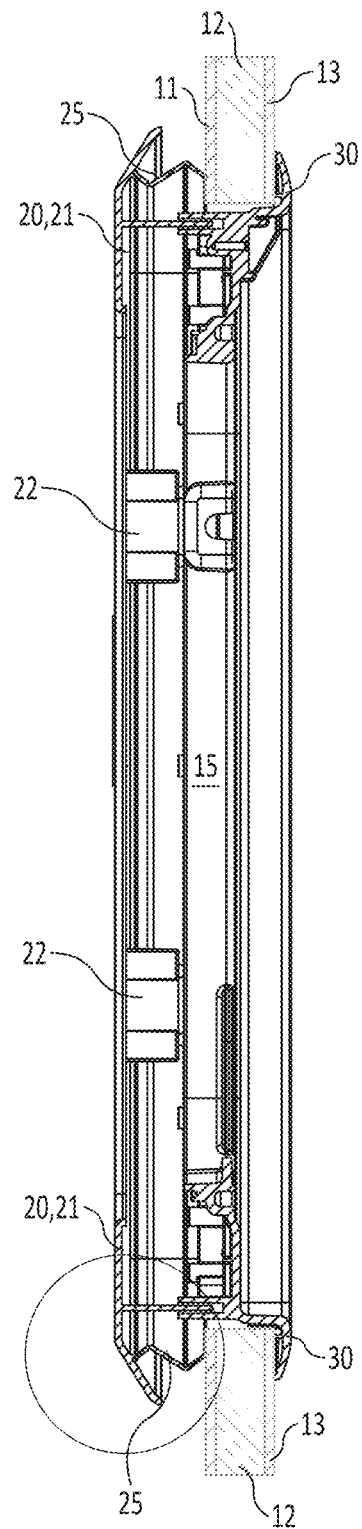
Fig.4

MOBILE ACCOMMODATION AND BORDER DEVICE

The present invention relates to a mobile accommodation, particularly a recreational accommodation such as a boat, camper or caravan, comprising a room enclosed by walls, wherein at least one of the walls comprises an opening in which an optionally transparent window is arranged, wherein arranged on a first side all around the opening is a casing frame in which the window is mounted, and wherein a border device is provided all around the opening on an opposite side.

Such a mobile accommodation is widely known as camper or caravan, also referred to as mobile home, and is mainly used as recreational accommodation for shorter or longer periods of time. Use is usually made of a rolling, optionally self-propelling chassis on which is realized a superstructure of sandwich walls which will form the semi-permanent accommodation. The walls for instance comprise a hard-shell interior and exterior covering which are mutually separated by an insulating intermediate layer of polymer foam. Openings are formed therein at a number of positions for the purpose of receiving windows, doors, hatches and the like in order to allow entry, ventilation and entry of light.

For practical and rapid installation of such windows use is preferably made for this purpose of a casing frame in which an optionally openable window is mounted beforehand together with optional hanging and closing fittings, and which is mounted in and/or around the opening as a whole. On an inner side of the room the opening is usually finished all around with a border device which conceals the casing frame at least partially from view from this side and can optionally provide window accessories such as an optionally light-excluding (roller) blind and/or an insect screen for keeping insects out.

It is desirable here for the installation of the casing frame and the border device to connect seamlessly to the wall in which the window is provided. In practice, there are however frequently variations in the thickness of the walls used by different manufacturers of such accommodations, and there may also be fluctuations in the applied walls within a single manufacturer's range as a result of unavoidable tolerances in the dimensions of the plate materials supplied therefor.

The present invention has for its object, among others, to provide a mobile accommodation of the type described in the preamble, wherein possible variations in the thickness of the walls can be accommodated, at least to a satisfactory height, while maintaining fit.

In order to achieve the stated object a mobile accommodation of the type stated in the preamble has the feature according to the invention that the casing frame and the border device are connected to each other for axial adjustment transversely of the wall while enclosing a wall part of the wall, and that the border device comprises a relatively stiff frame body which carries on a side facing toward the wall a flexible skirt and lies sealingly against the wall therewith.

The casing frame and the border device thus slide or glide in each other while enclosing the wall of the accommodation. Owing to the adjustability of these two parts relative to each other, variations in the thickness of the wall can be accommodated here over the adjustment range. The flexible, compressible skirt adapts thereto by contracting to greater or lesser extent and thus preventing a gaping gap which would otherwise be possible between the border and the wall.

A particular embodiment of the mobile accommodation has the feature according to the invention that a first of the casing frame and the border device comprises a number of receiving cavities, that a corresponding number of members receivable in the receiving cavities extends from a second of the casing frame and the border device, and that the receivable members are received in the receiving cavities in axially adjustable manner in mutually connecting co-action. A preferred embodiment of the mobile accommodation is characterized here in that the receiving cavities comprise snap cavities and the receivable members snap members co-acting therewith. The receivable members, particularly the snap members, thus slide in the receiving cavities while the wall part is enclosed therebetween and a connection is brought about between the receivable members and the receiving cavities.

Although the border device can be composed of separate, individual parts, a preferred embodiment of the mobile accommodation has the feature according to the invention that the frame body forms one whole with the skirt and particularly extends together therewith all around the opening. Such a unitary construction avoids additional assembly steps. If the border device moreover extends integrally all around the opening, the device can furthermore be arranged in a single fitting step.

A particular embodiment of the mobile accommodation has in this latter respect the feature that the skirt is moulded integrally on the frame body from a plastic compatible with the frame body, and more particularly that the frame body is formed from a first plastic, particularly from acrylonitrile styrene acrylate (ASA), and that the skirt is formed from a second plastic compatible therewith, particularly from a thermoplastic elastomer. Modern manufacturing techniques such as co-extrusion and hybrid injection moulding allow different plastics to be combined in a unitary body. A rigid, form-retaining frame body can thereby be integrated in an encompassing border device using a flexible, compressible skirt of plastics adapted thereto.

A particular embodiment of the mobile accommodation according to the invention has the feature that the skirt is compressible transversely of the wall. The skirt can per se provide for the desired adjustment to varying wall thicknesses in diverse ways. A compressible foam lining can thus for instance be applied for this purpose. A preferred embodiment however has the feature that the skirt comprises a sheet having a corrugated, compressible cross-section transversely of the wall. Such a compressible sheet provides an attractive appearance in combination with a relatively wide adjustment range within which the wall thickness can vary without resulting in a gap.

The invention also relates to a border device for application all around an opening in a wall of an accommodation, comprising a relatively stiff frame body formed in accordance with a contour of the opening, wherein the frame body carries all around a compressible skirt intended and configured to lie sealingly against the wall under pressure.

The invention will be further elucidated hereinbelow with reference to an exemplary embodiment and an accompanying drawing. In the drawing:

FIG. 3 shows a side view of the border device of FIG. 2;

FIG. 4 shows a cross-section along the line A-A in FIG. 1 of the border device of FIG. 2;

FIG. 4A shows an enlargement of a part of the border device of FIG. 2.

Figure 1:
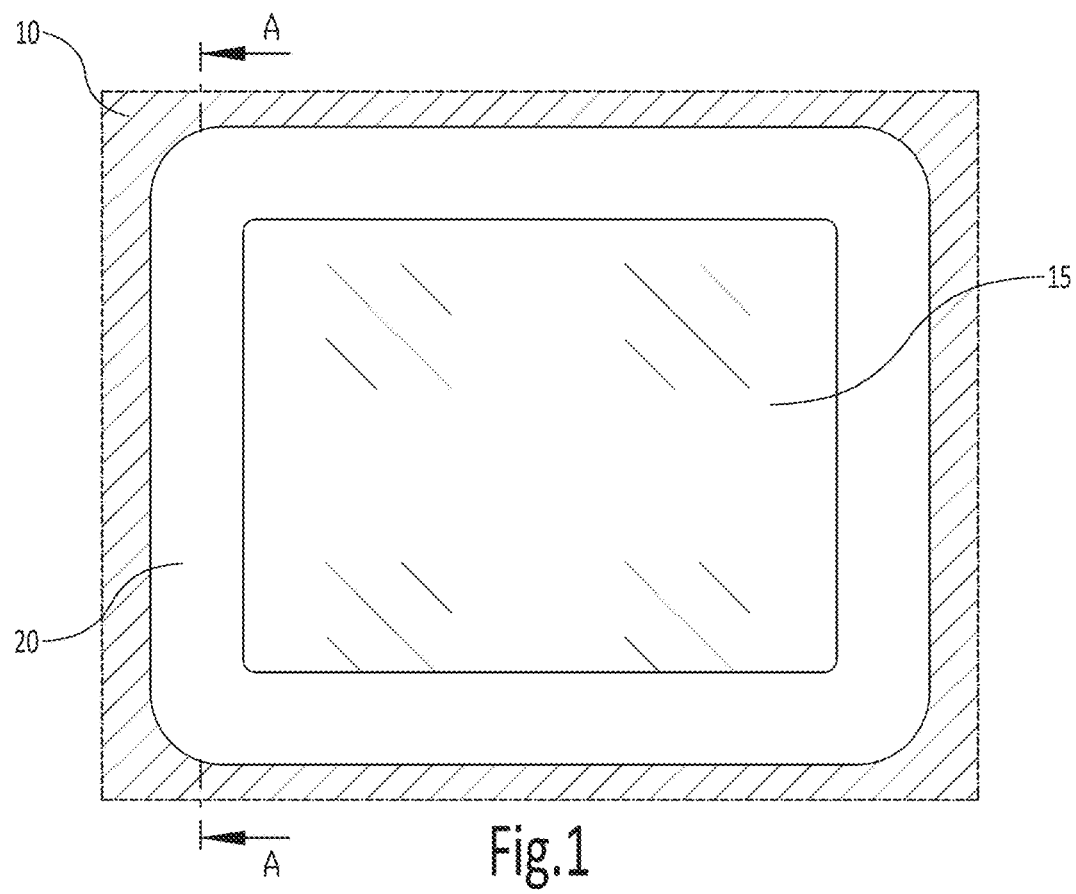
FIG. 1 shows a front view of a part of a wall of a mobile accommodation according to an embodiment of the invention, as seen from a viewpoint inside a room situated therein.

It is noted here that the figures are intended to be purely schematic and are not all drawn to (the same) scale. Some dimensions in particular may be exaggerated to greater or lesser extent for the sake of clarity. Corresponding parts are generally designated in the figures with the same reference numeral.

FIG. 1 shows by way of illustration a part of a wall 10 of a mobile accommodation, such as a camper or caravan, in which a window opening 15 is recessed for receiving an optionally openable window. The wall bounds a room in the accommodation which provides a place to stay for the shorter or longer term, usually for recreational use. FIG. 4 shows wall 10 in cross-section. The wall comprises an insulating core 12 of a polymer foam, such as polyurethane foam or polystyrene foam, which is flanked on either side by hard outer shells 11, 13 of respectively aluminium or plastic on the outer side and plastic or wood on the inner side.

Window 15 is pre-mounted together with hanging and closing fittings, not further shown here, in a casing frame 30 which is arranged externally in and/or round opening 15, see also FIG. 4. The casing frame is usually, as it is here, manufactured from aluminium. Mainly used for this purpose are extrusion profiles which are assembled to form the casing frame. Window 15 is here a double-walled transparent window composed of a set of combined transparent plastic plates of poly(methyl methacrylate) (PMMA) or a similar transparent plastic, these maintaining relative to each other a thermally and acoustically insulating cavity.

Figure 2:
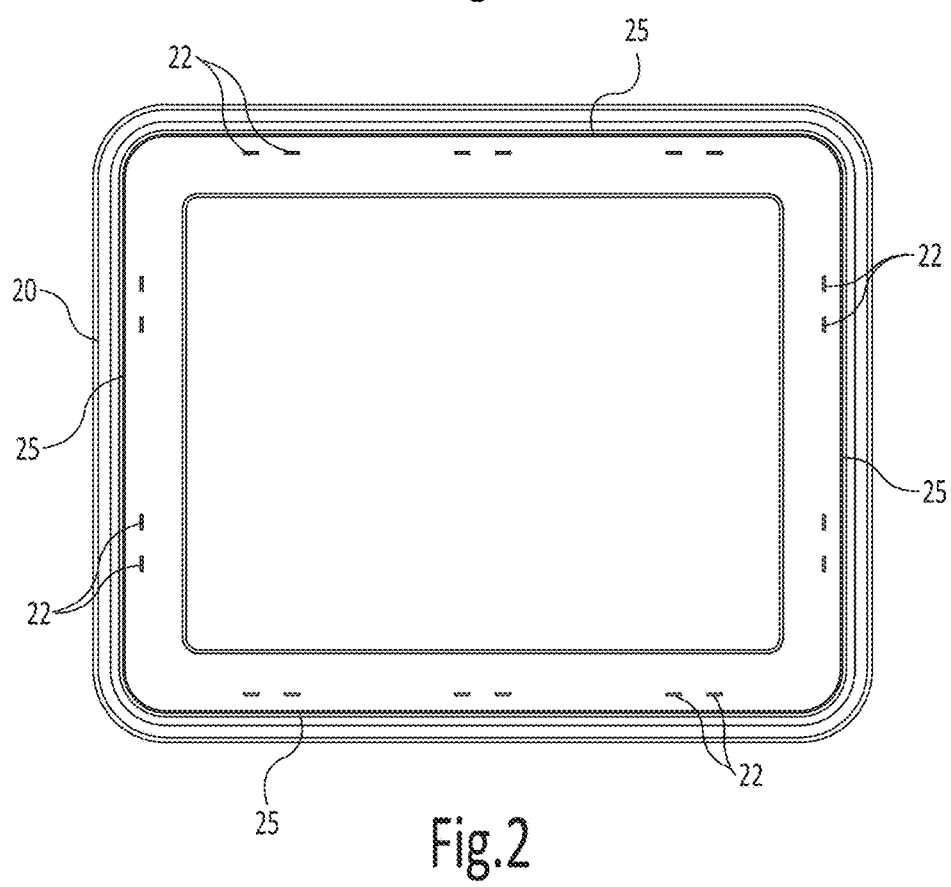
FIG. 2 shows a rear side of the border device as applied in the mobile accommodation of FIG. 1.

Wall opening 15 is finished internally with a border device 20. This comprises one or more relatively stiff shell parts 21 together with a flexible, compressible skirt 25, which extend all around the window opening 15. On a rear side, see FIG. 2, a large number of snap fingers 22 extend from the shell part and are received in corresponding snap cavities in the casing frame. After mounting of casing frame 30 the border device 20 can be arranged in relatively rapid and simple manner by aligning the snap fingers 22 with the snap cavities and sliding them therein.

The snap cavities have on their inner wall a series of successive shoulders or teeth whereby a coupling is brought about at successive positions while enclosing the intermediate wall part. The mutual connection is thus axially adjustable transversely of wall 10. This accommodates almost unavoidable variations in the wall thickness of walls in which the assembly of the border device (inner frame) and casing frame (outer frame) must be provided. Not only does this thickness vary per manufacturer/customer, but also between manufacturers. The assembly can be adapted thereto by bringing the border device and the casing frame closer or less close together while enclosing the wall part, wherein the snap fingers 22 will engage further or less far in the snap cavities.

In order to prevent an inconvenient gap from inadvertently resulting on the inner side the border device comprises on the side facing toward the wall a flexible, compressible skirt 25. This skirt 25 is here formed by a foldable sheet of a suitable thermoplastic elastomer, for instance a polyolefin such as polypropylene, polyethylene or EPDM (ethylene propylene diene monomer) or a polystyrene block copolymer, which is moulded integrally on the shell part 21. Use is made for this purpose of a hybrid injection moulding process. Shell parts 21 are manufactured from acrylonitrile styrene acrylate (ASA), which in such an injection moulding process works well with the plastic used for the skirt 25. A relatively stiff, hard-shell shell part 21 from which a flexible, foldable skirt hangs downward for lying therewith against the wall 10 of the accommodation is thus produced in a single production step. Skirt 25 here adapts under pressure to a possible variation in wall thickness by compressing to greater or lesser extent and thus preventing a gap.

All in all, the invention thus provides a particularly practical and flexible solution which, within its adjustability, is effective against thickness variations of the relevant wall. Although the invention has been described further on the basis of only a single exemplary embodiment, it will be apparent that the invention is by no means limited thereto. On the contrary, many variations and embodiments are still possible for a person with ordinary skill in the art.

The invention claimed is:

1. Mobile accommodation, particularly a recreational accommodation, comprising a room enclosed by walls, wherein at least one of the walls comprises an opening in which an optionally transparent window is arranged, wherein arranged on a first side all around the opening is a casing frame in which the window is mounted, and wherein a border device is provided all around the opening on an opposite side, wherein the casing frame and the border device are connected to each other for axial adjustment transversely of the wall while enclosing a wall part of the wall, and wherein the border device comprises a relatively stiff frame body which carries on a side facing toward the wall a flexible skirt and lies sealingly against the wall therewith.

2. Mobile accommodation, particularly a recreational accommodation such as a boat, camper or caravan, comprising a room enclosed by walls, wherein at least one of the walls comprises an opening in which an optionally transparent window is arranged, wherein arranged on a first side all around the opening is a casing frame in which the window is mounted, and wherein a border device is provided all around the opening on an opposite side, wherein the casing frame and the border device are connected to each other for axial adjustment transversely of the wall while enclosing a wall part of the wall, and wherein the border device comprises a relatively stiff frame body which carries on a side facing toward the wall a flexible skirt and lies sealingly against the wall therewith, wherein a first of the casing frame and the border device comprises a number of receiving cavities, wherein a corresponding number of members receivable in the receiving cavities extends from a second of the casing frame and the border device, and wherein the receivable members are received in the receiving cavities in axially adjustable manner in mutually connecting co-action.

3. Mobile accommodation according to claim 2, wherein the receiving cavities comprise snap cavities and the receivable members snap members co-acting therewith.

4. Mobile accommodation according to claim 1, wherein the frame body forms one whole with the skirt and particularly extends together therewith all around the opening.

5. Mobile accommodation according to claim 4, wherein the skirt is moulded integrally on the frame body from a plastic compatible with the frame body.

6. Mobile accommodation according to claim 5, wherein the frame body is formed from a first plastic, particularly from acrylonitrile styrene acrylate (ASA), and wherein the skirt is formed from a second plastic compatible therewith, particularly from a thermoplastic elastomer.

7. Mobile accommodation according to claim 1, wherein the skirt is compressible transversely of the wall.

8. Mobile accommodation, particularly a recreational accommodation such as a boat, camper or caravan, comprising a room enclosed by walls, wherein at least one of the walls comprises an opening in which an optionally transparent window is arranged, wherein arranged on a first side all around the opening is a casing frame in which the window is mounted, and wherein a border device is provided all around the opening on an opposite side, wherein the casing frame and the border device are connected to each other for axial adjustment transversely of the wall while enclosing a wall part of the wall, and wherein the border device comprises a relatively stiff frame body which carries on a side facing toward the wall a flexible skirt and lies sealingly against the wall therewith, wherein the skirt is compressible transversely of the wall, wherein the skirt comprises a sheet having a corrugated, compressible cross-section transversely of the wall.

9. Border device for application all around an opening in a wall of an accommodation, comprising a relatively stiff frame body formed in accordance with a contour of the opening, wherein the frame body carries all around a compressible skirt intended and configured to lie sealingly against the wall under pressure.

10. Mobile accommodation according to claim 1, wherein a first of the casing frame and the border device comprises a number of receiving cavities, wherein a corresponding number of members receivable in the receiving cavities extends from a second of the casing frame and the border device, and wherein the receivable members are received in the receiving cavities in axially adjustable manner in mutually connecting co-action.

11. Mobile accommodation according to claim 10, wherein the receiving cavities comprise snap cavities and the receivable members snap members co-acting therewith.

* * * * *